(12) United States Patent
Hipp et al.

(10) Patent No.: US 11,001,124 B2
(45) Date of Patent: May 11, 2021

(54) SYSTEM FOR CONTROLLING THE TEMPERATURE OF AN ENERGY STORE

(71) Applicant: Mahle International GmbH, Stuttgart (DE)

(72) Inventors: Christoph Hipp, Stuttgart (DE); Stefan Muckle, Weissach, GA (US); Markus Schauer, Marbach (DE); Deepak Sehgal, Stuttgart (DE); Raphael Zimmermann, Stuttgart (DE)

(73) Assignee: Mahle InternationI GmbH

( * ) Notice: Subject to any disclaimer, the term of this patent is extended or adjusted under 35 U.S.C. 154(b) by 0 days.

(21) Appl. No.: 16/632,506

(22) PCT Filed: Jun. 12, 2018

(86) PCT No.: PCT/EP2018/065446
§ 371 (c)(1),
(2) Date: Jan. 20, 2020

(87) PCT Pub. No.: WO2019/015880
PCT Pub. Date: Jan. 24, 2019

(65) Prior Publication Data
US 2020/0376921 A1    Dec. 3, 2020

(30) Foreign Application Priority Data
Jul. 21, 2017    (DE) .......................... 102017212588.8

(51) Int. Cl.
*B60H 1/00*    (2006.01)
*H01M 10/613*    (2014.01)
(Continued)

(52) U.S. Cl.
CPC .......... *B60H 1/00278* (2013.01); *B60K 11/02* (2013.01); *B60L 50/60* (2019.02);
(Continued)

(58) Field of Classification Search
None
See application file for complete search history.

(56) References Cited

U.S. PATENT DOCUMENTS

| 3,556,204 A | 1/1971 | Manfred |
|---|---|---|
| 5,279,360 A | 1/1994 | Hughes et al. |

(Continued)

FOREIGN PATENT DOCUMENTS

| DE | 4319293 A1 | 12/1994 |
|---|---|---|
| DE | 4415129 C1 | 4/1995 |

(Continued)

OTHER PUBLICATIONS

English abstract for DE-10012197.
(Continued)

*Primary Examiner* — Sarah A. Slifka
(74) *Attorney, Agent, or Firm* — Fishman Stewart PLLC

(57) ABSTRACT

A system for controlling temperature of an energy store in a motor vehicle may include a coolant circuit in which a coolant may be flowable and into which the energy store may be incorporated in the thermally conductive manner, a refrigerant circuit in which a refrigerant may be flowable and including a refrigerant compressor, a flat tube condenser, and a receiver dryer, which may be secured in the flat tube condenser, and a refrigerant evaporator connecting the coolant circuit and the refrigerant circuit. Heat between the coolant and the refrigerant may be transferrable in the refrigerant evaporator. The system may be secured in a housing. A large area of the flat tube condenser, through which air may be flowable, and the receiver dryer, which may be secured in the flat tube condenser, may have an operating angle of greater than 5° and smaller than 90° with respect to an operating horizontal plane, wherein the operating angle may be selected in such a way that dimensions (Continued)

of the system may be adapted to desired values and the system may be designed in a more compact manner.

20 Claims, 1 Drawing Sheet

(51) Int. Cl.
*H01M 10/625* (2014.01)
*H01M 10/663* (2014.01)
*B60L 50/60* (2019.01)
*B60L 58/26* (2019.01)
*B60K 11/02* (2006.01)
*B60K 1/00* (2006.01)

(52) U.S. Cl.
CPC ........... *B60L 58/26* (2019.02); *H01M 10/613* (2015.04); *H01M 10/625* (2015.04); *H01M 10/663* (2015.04); *B60K 2001/005* (2013.01)

(56) References Cited

U.S. PATENT DOCUMENTS

| | | | |
|---|---|---|---|
| 5,419,141 A | 5/1995 | Burk | |
| 9,346,338 B2 | 5/2016 | Major et al. | |

FOREIGN PATENT DOCUMENTS

| | | | |
|---|---|---|---|
| DE | 69209817 T2 | 8/1996 | |
| DE | 19625927 A1 | 1/1998 | |
| DE | 10012197 A1 | 9/2001 | |
| DE | 102006048664 A1 | 4/2008 | |
| DE | 102009008608 A1 | 10/2009 | |
| EP | 1340634 A1 | 9/2003 | |
| FR | 2975230 A1 | 11/2012 | |
| WO | 2006/087201 | 8/2006 | |

OTHER PUBLICATIONS

English abstract for DE-102006048664.
English abstract for DE-4415129.
English abstract for FR-2975230.

US 11,001,124 B2

SYSTEM FOR CONTROLLING THE TEMPERATURE OF AN ENERGY STORE

CROSS-REFERENCE TO RELATED APPLICATIONS

This application claims priority to International Patent Application No. PCT/EP2018/065466, filed on Jun. 12, 2018, and German Patent Application No. DE 10 2017 212 588.8, filed on Jul. 21, 2017, the contents of both of which are hereby incorporated by reference in their entirety.

TECHNICAL FIELD

The invention relates to a system for controlling the temperature of an energy store in a motor vehicle. The invention also relates to a motor vehicle comprising the system.

BACKGROUND

Systems for controlling the temperature of energy stores in an electric or in a hybrid vehicle are already known—for example from DE 10 2016 108 486 A1. A system of this type thereby usually has a coolant cooler, which, in a coolant circuit, is connected in a thermally conducting manner to an energy store—for example a traction battery. The energy store thereby dissipates the generated heat to the coolant, which is subsequently cooled in the coolant cooler. The ambient air can thereby flow, for example, through the coolant cooler, and the coolant can thus be cooled.

To be able to cool the coolant and thus the energy stored even in the case of a high external temperature, the system usually also has a refrigerant circuit. The refrigerant circuit usually comprises a refrigerant compressor, a receiver dryer, and a flat tube condenser. The refrigerant compressor compresses the refrigerant, which is subsequently cooled in the flat tube condenser and is freed from the residual water and collected in the receiver dryer. The flat tube condenser is thereby arranged so that air can flow through, and the receiver dryer is usually operated vertically in order to attain the highest possible efficiency.

The refrigerant circuit and the coolant circuit can be connected to one another via an evaporator or chiller, respectively—an evaporative cooling-based cooling unit—so that the refrigerant can be cooled in the evaporator or chiller, respectively. In the case of a high external temperature, the coolant can thus additionally be cooled in the refrigerant circuit, and the heat generated in the energy store can be discharged effectively.

Such systems are usually subject to spatial limitations and have to be as compact and light as possible.

It is thus the object of the invention to specify an improved or at least alternative embodiment for a system of the generic type for designing the system in a compact and light manner.

SUMMARY

This object is solved according to the invention by means of the subject matter of the independent claims. Advantageous embodiments are subject matter of the dependent claims.

The present invention is based on the general idea of designing a system for controlling the temperature of an energy store in a motor vehicle in a more compact and lighter manner by alternatively arranging the components. The energy store can thereby be incorporated in a thermally conducting manner into a coolant circuit, and a refrigerant circuit comprises a refrigerant compressor and a flat tube condenser comprising a receiver dryer, which is secured in the flat tube condenser. A coolant can flow in the coolant circuit and a refrigerant can flow in the refrigerant circuit. The coolant circuit and the refrigerant circuit can be connected to one another by means of a refrigerant evaporator, wherein the heat can be transferred between the coolant and the refrigerant in the refrigerant evaporator. The system is further secured in a housing. According to the invention, a large area of the flat tube condenser, through which air can flow, and the receiver dryer, which is secured in the flat tube condenser, have an operating angle, which lies between 5° and 90° with respect to an operating horizontal plane.

In the present context, the term "energy store" is in particular understood to be an arrangement of one or a plurality of galvanic cells. They can in particular be primary or secondary cells, whereby the latter can also be referred to as accumulator. Provided that the energy store has a plurality of primary or secondary galvanic cells, it can also be referred to as battery.

To control the temperature, the energy store can be incorporated in a thermally conducting manner into the coolant circuit. The heat generated in the energy store can be dissipated to the coolant. In the alternative, the energy store can be heated by means of the hotter coolant even in the case of a lower external temperature. The heat stored in the coolant can then be dissipated to the environment, for example in a coolant cooler, which is incorporated into the coolant circuit. The coolant cooler can be arranged in the housing of the system, for example abutting on the flat tube condenser and so that air can flow through it, but installed externally. In the alternative, the coolant can also dissipate the stored heat in the refrigerant evaporator to the refrigerant, without a coolant cooler being provided in the coolant circuit.

In the case of an operation of the system, the operating horizontal plane is aligned horizontally to a bottom. In the case of a system installed in a motor vehicle, the operating horizontal plane lies in the vehicle X-Y plane and can correspond, for example, to a roof area or to a bottom area of the motor vehicle. In the flat tube condenser, the receiver dryer is usually arranged axially parallel to collector tubes of the flat tube condenser. The receiver dryer, which is secured in the flat tube condenser, can thereby be arranged parallel to the large area of the flat tube condenser. The dead weight of the system can be reduced in an advantageous manner by a collapsing of the flat tube condenser and of the receiver dryer. The operating angle of the large area of the flat tube condenser corresponds to the operating angle of the receiver dryer with respect to the operating horizontal plane and lies between 5° and 90° in accordance with the invention. The incorporated receiver dryer is surprisingly also operational and efficient in the case of the operating angle, which lies between 5° and 90°, so that the system is constructed in a more compact manner and the function of the receiver dryer is maintained by means of the solution according to the invention.

In the system according to the invention, the operating angle of the flat tube condenser comprising the incorporated receiver dryer can advantageously be different with respect to the operating horizontal plane, so that the flat tube condenser, which is designed identically, comprising the incorporated receiver dryer can be used for the systems with different dimensions. The flat tube condenser comprising the incorporated receiver dryer can be produced cost-efficiently in mass production in this way and the overall costs of the respective system can be reduced.

It is provided that the housing has a planar housing bottom. Alternatively or additionally, it is provided that the housing is designed essentially in a cuboid shape, wherein the housing bottom is rectangular and the housing has two long side walls, which are parallel to one another, and two short side walls, which are parallel to one another. The battery horizontal plane can advantageously extend parallel to the planar housing bottom, and the flat tube condenser can be arranged below the operating angle with respect to the housing bottom. The falt tube condenser can then be secured to the short side wall or to the long side walls and to the housing bottom by means of a screw connection.

The housing of the system can consist of a—metal for example of aluminum or of an aluminum alloy—or alternatively of a plastic—for example of expanded polypropylene. A combination of different materials is further also possible. To reduce the dead weight of the system, the housing can also have a lightweight structure.

It is advantageously provided that the coolant circuit has a coolant cooler, which can be connected in a thermally conducting manner to the energy store. In the coolant circuit, the heat generated in the energy store can be dissipated to the coolant, which flows through the coolant cooler. In the coolant cooler, the heat stored in the coolant is dissipated to the environment and the coolant is cooled in this way. The coolant cooler can be, for example, a flat tube heat exchanger. To arrange the coolant cooler in the housing of the system in a space-saving manner, the coolant cooler can be arranged so as to abut on the large area of the flat tube condenser and so that air can flow through it.

The refrigerant evaporator can further be, for example, a stacked-plate heat exchanger, in order to reduce the dead weight of the system and to design the system in a more compact manner. The refrigerant compressor can be driven electrically and can have a metal housing, preferably of aluminum.

As a whole, the system according to the invention can be constructed in a compact manner and the dead weight of the system can be reduced advantageously.

The invention also relates to a motor vehicle, wherein, according to the invention, the motor vehicle has an above-described system for controlling the temperature of an energy store. The system is thereby connected in a thermally conducting manner to the energy store, so that the energy store can dissipate the generated heat to the coolant. According to the invention, a large area of a flat tube condenser, through which air can flow, and a receiver dryer, which is secured in the flat tube condenser, has an operating angle, which lies between 5° and 90°, with respect to an operating horizontal plane. The operating horizontal plane of the system can advantageously correspond to the vehicle X-Y plane and/or can run parallel to a roof area of the motor vehicle. The system can be constructed to be more compact in this way and the space requirement in the motor vehicle can be reduced.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
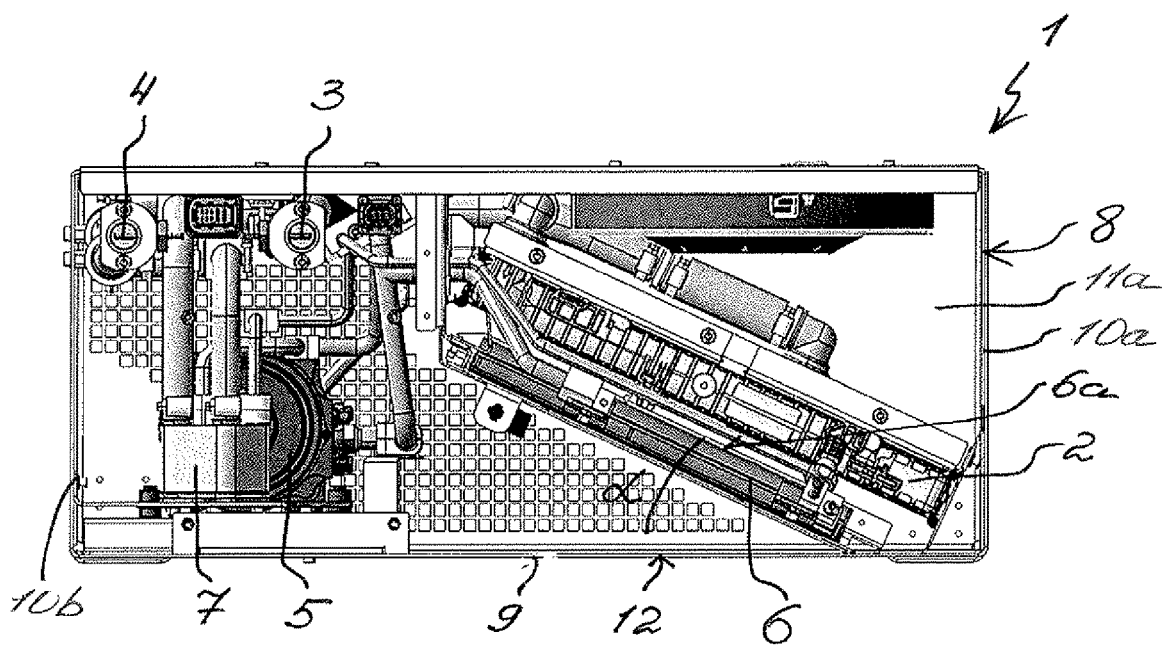
FIG. 1 shows a side view of a system according to the invention.
Figure 2:
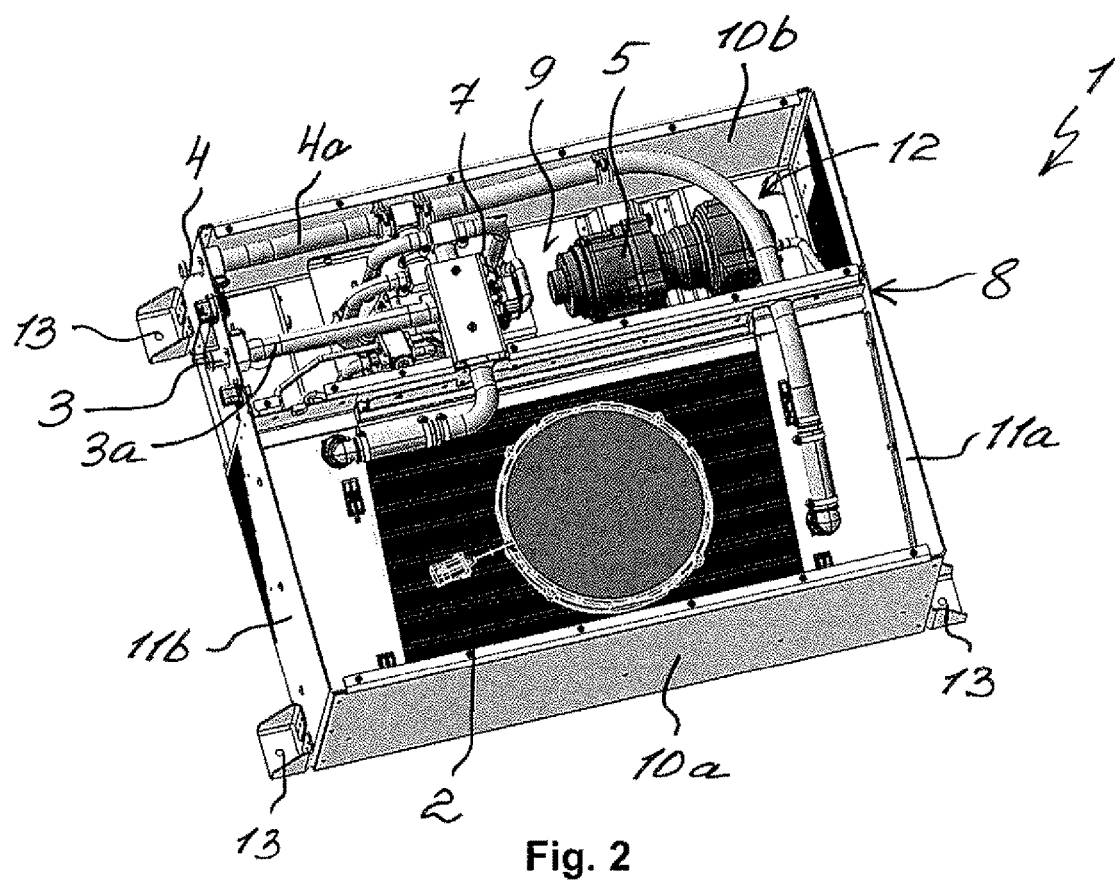
FIG. 2 shows a plan view of the system shown in FIG. 1 from the top.

FIG. 1 shows a side view and FIG. 2 shows a plan view of a system 1 according to the invention from the top. A coolant circuit thereby comprises a coolant cooler 2, which can be connected in a thermally conducting manner to an energy store—not shown here—by means of a coolant inlet 3 and a coolant outlet 4. The heat generated in the energy store can be dissipated to a coolant in the coolant circuit and the energy store can be cooled in this way. The coolant inlet 3 and the coolant outlet 4 are connected in a coolant-conducting manner to the coolant cooler 2 by means of the coolant tubes 3a and 4a. A refrigerant circuit further comprises a refrigerant compressor 5 and a flat tube condenser 6 comprising a receiver dryer—not shown here—which is secured in the flat tube condenser 6. A refrigerant can thereby flow in the refrigerant circuit. The coolant circuit and the refrigerant circuit can be connected to one another by means of a refrigerant evaporator 7, wherein, in the refrigerant evaporator 7, the heat stored in the coolant can be dissipated to the refrigerant. The system 1 is secured in a housing 8, which consist, for example, of a metal or of a plastic. In this exemplary embodiment, the housing 8 is designed in a cuboid shape and has a planar rectangular housing bottom 9, two long side walls 10a and 10b, which are parallel to one another, as well as two short side walls 11a and 11b, which are parallel to one another.

A large area 6a of the flat tube condenser 6, through which air can flow, and also the receiver dryer—not shown here—which is secured in the flat tube condenser 6, are arranged in the housing 8 at an operating angle α with respect to an operating horizontal plane 12. In this exemplary embodiment, the operating horizontal plane 12 is defined by the planar housing bottom 9, which can be secured, for example, to a roof area of a motor vehicle by means of fasteners 13. The operating angle α can vary between 5° and 90°, so that the system 1 can have different dimensions, depending on the operating angle α. The flat tube condenser 6 comprising the incorporated receiver dryer can be produced in a cost-efficient manner in mass production in this way and can be installed in the systems 1 with different dimensions. The total costs of the respective plant 1 can be reduced advantageously in this way.

As a whole, the system 1 according to the invention can be constructed in a compact manner and the dead weight of the system 1 can be reduced in an advantageous manner.

The invention claimed is:

1. A system for controlling temperature of an energy store in a motor vehicle, comprising:
   a coolant circuit in which a coolant is flowable and into which the energy store is able to be incorporated in a thermally conducting manner;

a refrigerant circuit in which a refrigerant is flowable and including a refrigerant compressor, a flat tube condenser, and a receiver dryer, which is secured in the flat tube condenser;

a refrigerant evaporator connecting the coolant circuit and the refrigerant circuit;

wherein heat between the coolant and the refrigerant is transferrable in the refrigerant evaporator;

wherein the system is secured in a housing; and wherein a large area of the flat tube condenser, through which air is flowable, and the receiver dryer, which is secured in the flat tube condenser, have an operating angle of greater than 5° and smaller than 90° with respect to an operating horizontal plane, wherein the operating angle is selected in such a way that dimensions of the system are adapted to desired values and the system is designed in a more compact manner.

2. The system according to claim 1, wherein the receiver dryer, which is secured in the flat tube condenser, is arranged parallel to the large area of the flat tube condenser.

3. The system according to claim 1, wherein:

the housing has a planar housing bottom; or the housing is designed essentially in a cuboid shape, wherein the housing bottom is rectangular and the housing has two long side walls, which are parallel to one another, and two short side walls, which are parallel to one another.

4. The system according to claim 3, wherein the operating horizontal plane extends parallel to the planar housing bottom.

5. The system according to claim 1, the coolant circuit has a coolant cooler, which is connectable in a thermally conducting manner to the energy store.

6. The system according to claim 5, wherein the coolant cooler is a flat tube heat exchanger.

7. The system according to claim 6, wherein the coolant cooler is arranged so as to abut on the large area of the flat tube condenser and so that air is flowable through it.

8. The system according to claim 1, wherein the refrigerant evaporator is a stacked-plate heat exchanger.

9. The system according to claim 1, wherein the housing consists of a metal, preferably of aluminum or of an aluminum alloy, or a plastic, preferably of expanded polypropylene.

10. The system according to claim 1, wherein the refrigerant compressor is electrically driven and has a metal housing, preferably of aluminum.

11. A motor vehicle comprising:

an energy store; and a system for controlling temperature of the energy store and which is connected to the energy store in a thermally conductive manner, the system including:

a coolant circuit in which a coolant is flowable and into which the energy store is incorporated in the thermally conductive manner;

a refrigerant circuit in which a refrigerant is flowable and including a refrigerant compressor, a flat tube condenser, and a receiver dryer, which is secured in the flat tube condenser;

a refrigerant evaporator connecting the coolant circuit and the refrigerant circuit;

wherein heat between the coolant and the refrigerant is transferrable in the refrigerant evaporator;

wherein the system is secured in a housing; and wherein a large area of the flat tube condenser, through which air is flowable, and the receiver dryer, which is secured in the flat tube condenser, have an operating angle of greater than 5° and smaller than 90° with respect to an operating horizontal plane, wherein the operating angle is selected in such a way that dimensions of the system are adapted to desired values and the system is designed in a more compact manner.

12. The vehicle according to claim 11, wherein the operating horizontal plane of the system at least one of (i) corresponds to a vehicle X-Y plane, and (ii) runs parallel to a roof area of the motor vehicle.

13. The vehicle according to claim 11, wherein the receiver dryer, which is secured in the flat tube condenser, is arranged parallel to the large area of the flat tube condenser.

14. The vehicle according to claim 11, wherein:

the housing has a planar housing bottom; or the housing is designed essentially in a cuboid shape, wherein the housing bottom is rectangular and the housing has two long side walls, which are parallel to one another, and two short side walls, which are parallel to one another.

15. The vehicle according to claim 14, wherein the operating horizontal plane extends parallel to the planar housing bottom.

16. The vehicle according to claim 11, the coolant circuit has a coolant cooler, which is connectable in a thermally conducting manner to the energy store.

17. The vehicle according to claim 16, wherein the coolant cooler is a flat tube heat exchanger.

18. The system according to claim 9, wherein the metal is aluminum or an aluminum alloy.

19. The system according to claim 9, wherein the plastic is expanded polypropylene.

20. The system according to claim 10, wherein the metal housing is aluminum.

* * * * *